United States Patent
Gao et al.

(10) Patent No.: US 10,789,004 B2
(45) Date of Patent: Sep. 29, 2020

(54) METHOD, SYSTEM AND COMPUTER PROGRAM PRODUCT FOR MANAGING STORAGE SYSTEM

(71) Applicant: EMC IP Holding Company LLC, Hopkinton, MA (US)

(72) Inventors: Jian Gao, Beijing (CN); Wayne Weihua Li, Beijing (CN); Geng Han, Beijing (CN); Jamin Kang, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/171,879

(22) Filed: Oct. 26, 2018

(65) Prior Publication Data
US 2019/0129644 A1    May 2, 2019

(30) Foreign Application Priority Data
Oct. 27, 2017 (CN) .......................... 2017 1 1031272

(51) Int. Cl.
*G06F 3/06* (2006.01)
*G06F 11/20* (2006.01)
*G06F 12/02* (2006.01)

(52) U.S. Cl.
CPC .......... *G06F 3/0644* (2013.01); *G06F 3/0614* (2013.01); *G06F 3/0631* (2013.01); *G06F 3/0649* (2013.01); *G06F 3/0653* (2013.01); *G06F 3/0689* (2013.01); *G06F 11/2092* (2013.01); *G06F 11/2094* (2013.01); *G06F 12/0246* (2013.01); *G06F 2212/7211* (2013.01)

(58) Field of Classification Search
CPC ............ G06F 11/1076; G06F 11/2092; G06F 11/2094; G06F 12/0246; G06F 2212/7211; G06F 3/0614; G06F 3/0631; G06F 3/0644; G06F 3/0649; G06F 3/0653; G06F 3/0689
See application file for complete search history.

(56) References Cited

U.S. PATENT DOCUMENTS

| | | | |
|---|---|---|---|
| 6,912,635 B2 * | 6/2005 | Patterson | G06F 3/0601 711/111 |
| 7,873,619 B1 | 1/2011 | Faibish et al. | |
| 8,095,577 B1 | 1/2012 | Faibish et al. | |

(Continued)

*Primary Examiner* — Idriss N Alrobaye
*Assistant Examiner* — Richard B Franklin
(74) *Attorney, Agent, or Firm* — BainwoodHuang

(57) ABSTRACT

Implementations of the present disclosure relate to a method, system and computer program product for managing a storage system. Specifically, in one implementation of the present disclosure there is provided a method for managing a storage system. The method comprises: determining an access level of a target extent comprised in a stripe of a storage system, the access level indicating the possibility that the target extent will be accessed; obtaining a usage state of a target storage device where the target extent resides, the target storage device residing in a storage device pool associated with the storage system; and processing a mapping relationship between the target extent and the target storage device on the basis of the access level and the usage state. In other implementations of the present disclosure, there is provided a corresponding system and computer program product.

20 Claims, 10 Drawing Sheets

(56) References Cited

U.S. PATENT DOCUMENTS

| | | |
|---|---|---|
| 8,799,705 B2 | 8/2014 | Hallak et al. |
| 9,684,463 B1 * | 6/2017 | Alshinnawi ........... G06F 3/0631 |
| 10,318,169 B2 | 6/2019 | Dalmatov et al. |
| 10,365,845 B1 | 7/2019 | Foley et al. |
| 10,365,983 B1 | 7/2019 | Foley et al. |
| 10,496,482 B1 | 12/2019 | Foley et al. |
| 10,521,145 B1 | 12/2019 | Foley et al. |
| 10,521,302 B1 | 12/2019 | Gao et al. |

* cited by examiner

METHOD, SYSTEM AND COMPUTER PROGRAM PRODUCT FOR MANAGING STORAGE SYSTEM

RELATED APPLICATIONS

This application claim priority from Chinese Patent Application Number CN 201711031272.8, filed on Oct. 27, 2017 at the State Intellectual Property Office, China, titled "METHOD, SYSTEM AND COMPUTER PROGRAM PRODUCT FOR MANAGING STORAGE SYSTEM" the contents of which is herein incorporated by reference in its entirety.

FIELD

Various implementations of the present disclosure relate to storage management, and more specifically, to a method and system for managing a storage system (e.g. Redundant Array of Independent Disks (RAID)), as well as a computer program product.

BACKGROUND

With the development of data storage techniques, various data storage devices now provide users with higher data storage capacity, and also their data access speed has been increased greatly. With the increase of data storage capacity, users also impose greater and greater demands on data reliability and response time of storage systems. So far various data storage systems based on redundant arrays of disks have been developed for improving reliability of data. When one or more disks in a storage system fail(s), data in failed disk(s) can be recovered from other normal disk.

Mapped Redundant Array of Independent Disks (mapped RAID) has been developed so far. In the mapped RAID, a disk is a logical concept and may comprise multiple extents in a resource pool. Multiple extents comprised in one logical disk may be distributed over different physical storage devices. Regarding multiple extents in one stripe of the mapped RAID, they may be distributed over different storage devices, so that when a physical storage device where an extent among the multiple extents resides fails, data may be recovered from a physical storage device where other extent resides.

During use of the mapped RAID, access levels of different extents differ. This will lead to a difference in usage state between different storage devices where different extents reside, and further devices where some extents reside might become more susceptible to wear. At this point, it becomes a tough issue regarding how to handle a mapping relationship between extents and respective storage devices in a storage device pool.

SUMMARY

Therefore, it is desirable to develop and implement a technical solution for managing a storage system more easily and reliably. It is desired that the technical solution can be compatible with existing storage systems and manage data in existing storage systems more reliably by changing various configurations of these storage systems.

According to one implementation of the present disclosure, there is provided a method for managing a storage system. The method comprises: determining an access level of a target extent comprised in a stripe of a storage system, the access level indicating the possibility that the target extent will be accessed; obtaining a usage state of a target storage device where the target extent resides, the target storage device residing in a storage device pool associated with the storage system; and processing a mapping relationship between the target extent and the target storage device on the basis of the access level and the usage state.

According to one implementation of the present disclosure, there is provided a system for managing a storage system, comprising: one or more processors; a memory coupled to at least one processor of the one or more processors; computer program instructions stored in the memory which, when executed by the at least one processor, cause the system to execute a method for managing a storage system. The method comprises: determining an access level of a target extent comprised in a stripe of a storage system, the access level indicating the possibility that the target extent will be accessed; obtaining a usage state of a target storage device where the target extent resides, the target storage device residing in a storage device pool associated with the storage system; and processing a mapping relationship between the target extent and the target storage device on the basis of the access level and the usage state.

According to one implementation of the present disclosure, there is provided an apparatus for managing a storage system. The apparatus comprises: a determining module configured to determine an access level of a target extent comprised in a stripe of a storage system, the access level indicating the possibility that the target extent will be accessed; an obtaining module configured to obtain a usage state of a target storage device where the target extent resides, the target storage device residing in a storage device pool associated with the storage system; and a processing module configured to process a mapping relationship between the target extent and the target storage device on the basis of the access level and the usage state.

According to one implementation of the present disclosure, there are provided computer program instructions which, when executed by at least one processor, cause the at least one processor to execute a method for managing a storage system as described above.

With the technical solution of the present disclosure, storage systems may be managed in a more reliable manner.

BRIEF DESCRIPTION OF THE SEVERAL VIEWS OF THE DRAWINGS

Through the more detailed description in the accompanying drawings, the above and other objects, features and advantages of the implementations of the present invention will become more apparent. Several implementations of the present invention are illustrated schematically and are not intended to limit the present invention. In the drawings.

DETAILED DESCRIPTION

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
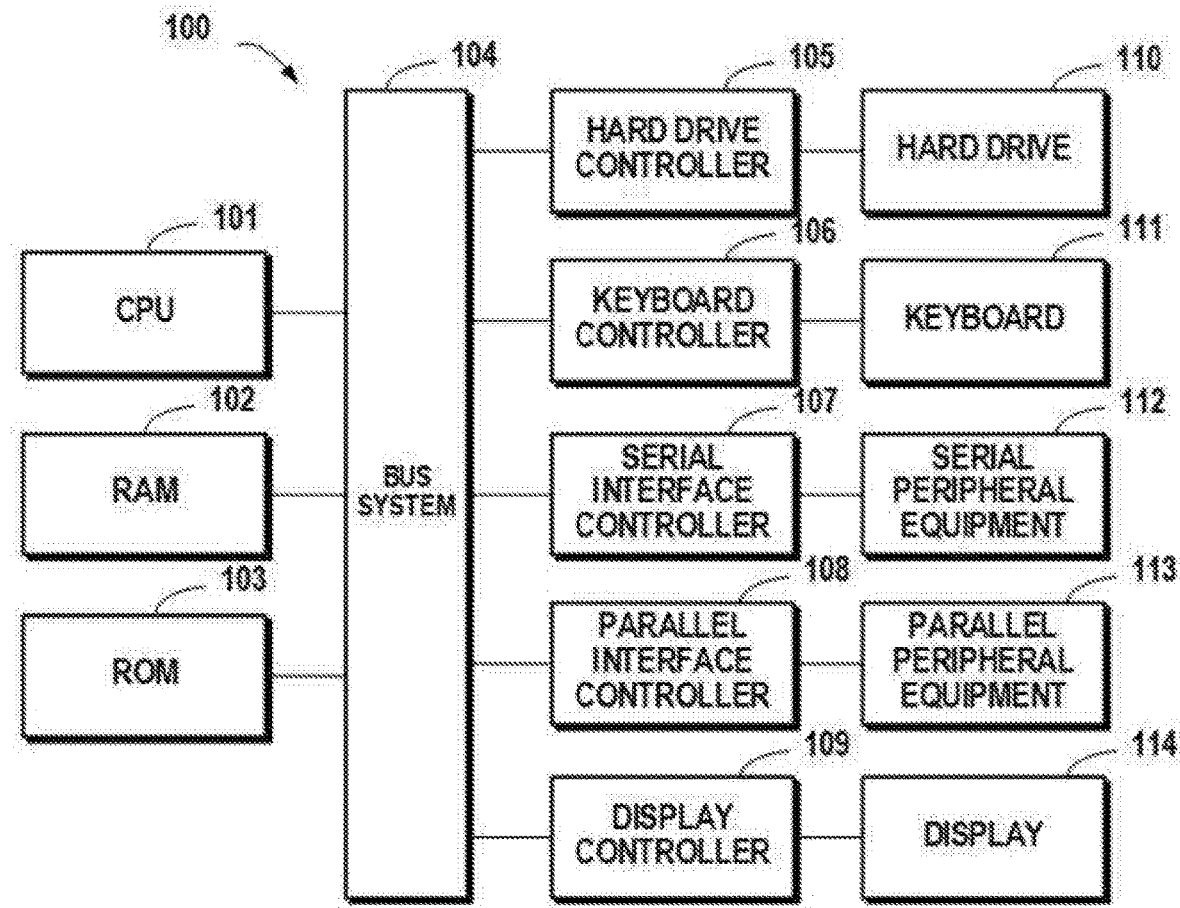
FIG. 1 schematically illustrates a block diagram of an exemplary computer system which is applicable to implement the implementations of the present disclosure.

FIG. 1 illustrates an exemplary computer system 100 which is applicable to implement the implementations of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or one implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In a storage system such as Redundant Array of Independent Disks (RAID), multiple storage devices (e.g. disks) may be combined into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

Figure 2A:
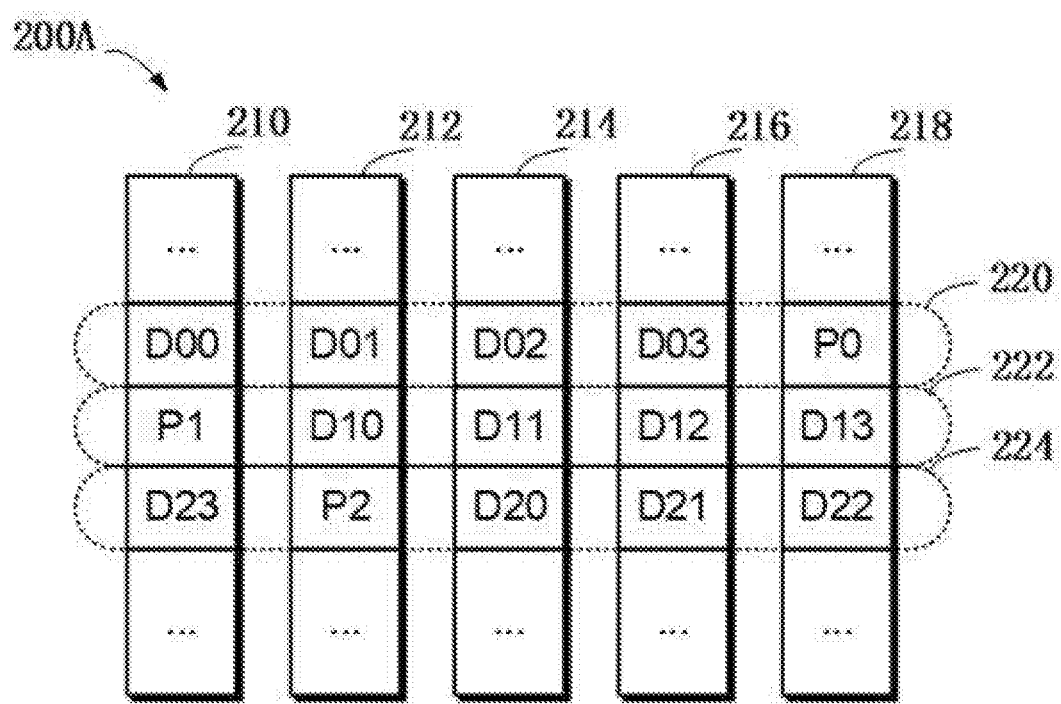
FIGS. 2A and 2B each schematically illustrates a view of an application environment where the implementations of the present disclosure may be implemented.

FIG. 2A schematically illustrates a schematic view 200A of a structure of RAID according to one technical solution. In this figure, working principles of RAID are illustrated by taking RAID-5 (4D+1P, where 4D represents that 4 storage devices are included in the storage system for storing data, and 1P represents that 1 storage device is included in the storage system for storing parity) that consists of five independent storage devices (210, 212, 214, 216 and 218) as an example. It should be noted although five storage devices are schematically shown in FIG. 2A, in other implementations more or less storage devices may be comprised according to different versions of RAID. Moreover, although in FIG. 2A there are shown stripes 220, 222 and 224, in other examples the RAID system may further comprise different numbers of stripes.

In RAID, one stripe crosses multiple physical storage devices (for example, the stripe 220 crosses storage the devices 210, 212, 214, 216 and 218). The stripe may be simply construed as a storage area among multiple storage devices which satisfies a given address range. Data stored in the stripe 220 comprises multiple parts: a data block D00 stored in the storage device 210, a data block D01 stored in the storage device 212, a data block D02 stored in the storage device 214, a data block D03 stored in the storage device 216, and a data block P0 stored in the storage device 218. In this example, data blocks D00, D01, D02 and D03 are stored data, and data block P0 is a P parity of the stored data.

The mode of storing data in other stripes 222 and 224 is similar to that in the stripe 220, and the difference is that the parity about other data block may be stored in other storage device than the storage device 218. In this way, when one of the multiple storage devices 210, 212, 214, 216 and 218 fails, data in the failing device may be recovered from other normal storage devices.

Figure 2B:
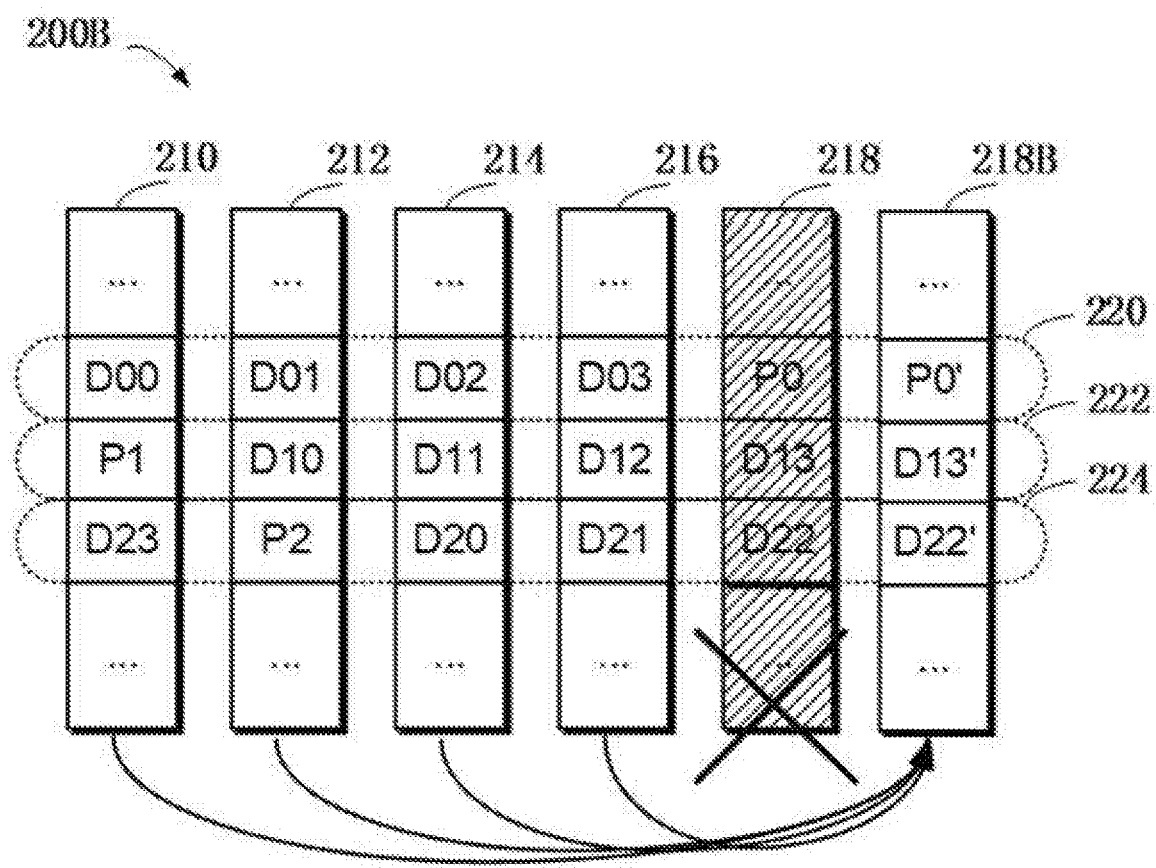

FIG. 2B schematically illustrates a schematic view 220B of rebuilding process of RAID according to one technical solution. As shown in FIG. 2B, when one storage device (e.g. the storage device 218 shown in shades) fails, data may be recovered from the other storage devices 210, 212, 214 and 216 that operate normally. At this point, a new standby storage device 218B may be added to RAID to replace the storage device 218. In this way, recovered data may be written to 218B, and system rebuilding may be realized.

While a RAID-5 storage system comprising 5 storage devices (among which 4 storage devices are used for storing data and 1 storage device is used for storing parity) has been described with reference to FIGS. 2A and 2B, according to definition of other RAID levels, there may further exist a storage system comprising other number of storage devices. On the basis of definition of RAID 6, for example, two storage devices may be used to store parity P and Q respectively. For another example, according to definition of triple-parity RAID, three storage devices may be used to store parity P, Q and R respectively.

Figure 3:
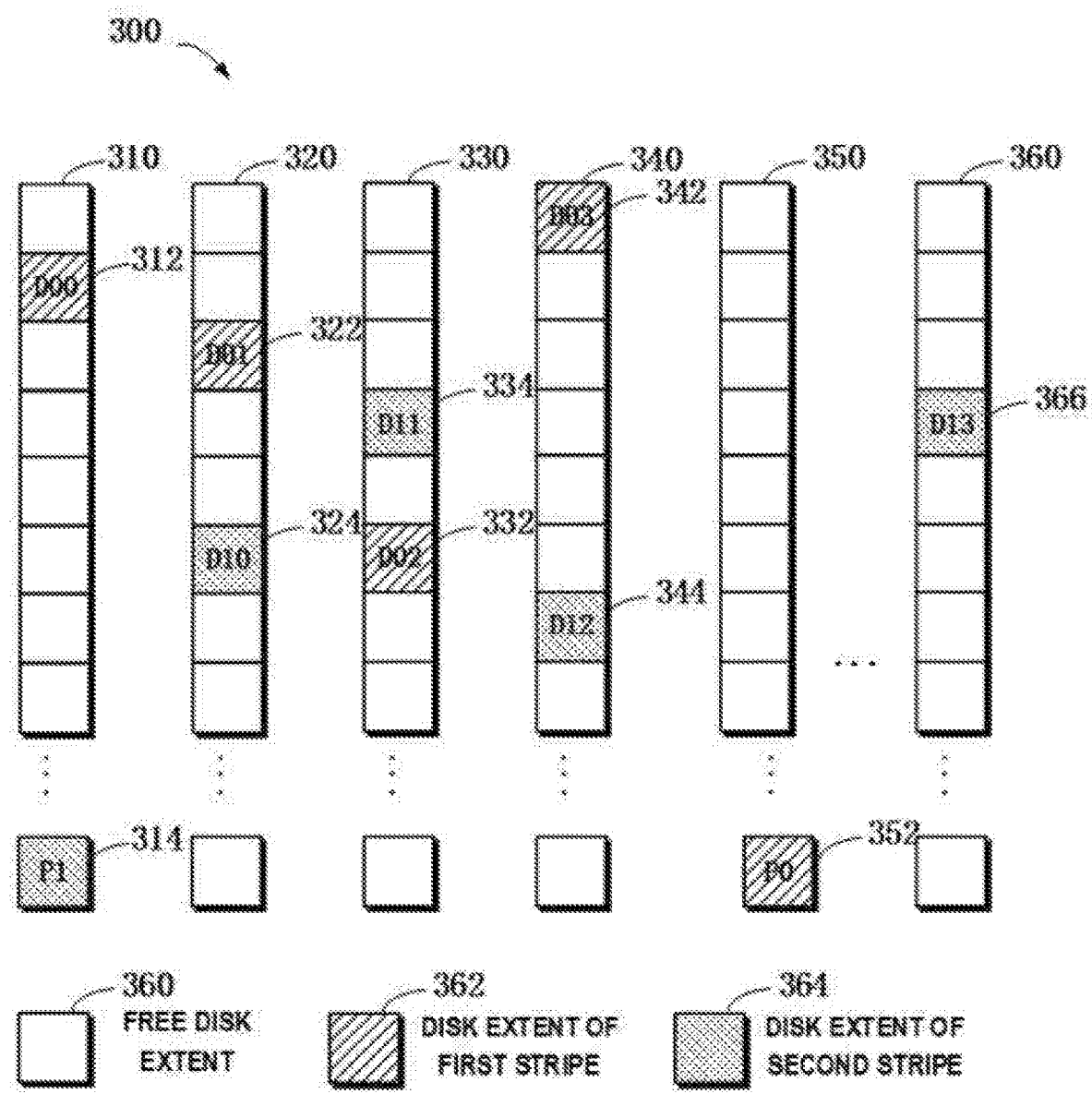
FIG. 3 schematically illustrates a block diagram of the distribution of extents in a mapped RAID storage system.

FIG. 3 schematically shows a block diagram 300 of the distribution of extents in a mapped RAID storage system. This figure illustrates multiple storage devices 310, 320, 330, 340, . . . , 350, 360. Each storage device may comprise multiple extents, wherein an extent shown with blank pattern 360 represents a free extent, an extent shown with stripe pattern 362 represents an extent for a first stripe, and an extent shown with shade pattern 364 represents an extent for a second stripe. At this point, extents 312, 322, 332, 342 and 352 for the first stripe are for storing data blocks D00, D01, D02, D03 and parity P0 of the first stripe respectively; extents 324, 334, 344, 366 and 314 for the second stripe are for storing blocks D10, D11, D12, D13 and parity P1 of the second stripe respectively.

Note in FIG. 3 the 4+1 R5 RAID storage system is taken as an example to illustrate how extents in various stripes are uniformly distributed over multiple storage systems in the resource pool. When RAID based on other level is used, those skilled in the art may implement concrete details based on the above described principles. For example, in the 4+2 RAID-6 storage system, the storage pool may at least comprise 6 storage devices. 6 extents in each stripe may be uniformly distributed over multiple storage devices so as to ensure a load balance between the multiple storage devices.

Note in the 4D+1P storage system, data access levels may differ among 5 extents in one stripe. For example, regarding 4 extents that store data, when a write is performed to any extent that stores data, the write needs to be further performed to the extent that stores parity. Therefore, the extent storing parity is more susceptible to be worn, which further reduces the reliability of the storage system and increases the risk that the storage system fails. At this point, how to guarantee the reliability of the storage system becomes a technical problem.

To solve the foregoing drawbacks, implementations of the present disclosure provide a method, device and program produce for managing a storage system. Specifically, according to one implementation of the present disclosure, there is provided a technical solution for managing a storage system.

Figure 4:
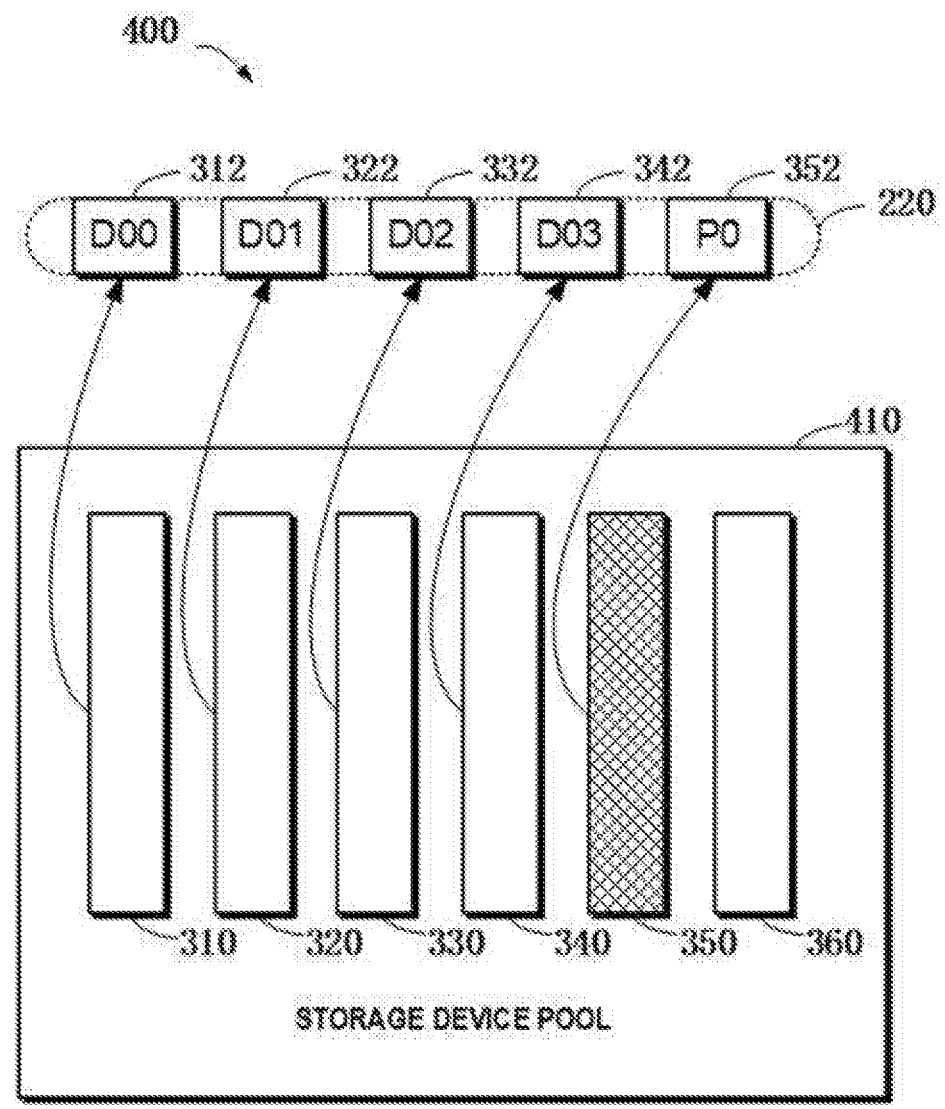
FIG. 4 schematically illustrates an architecture view for managing a storage system according to one implementation of the present disclosure.

FIG. 4 schematically shows an architecture view 400 for managing a storage system according to one implementation of the present disclosure. In this figure, depicted are multiple extents 312, 322, 332, 342 and 352 in one stripe 220 in the storage system (4D+1P). Based on principles of mapped RAID, these extents come from storage devices 310, 320, 330, 340, 350 and 360 comprised in a storage device pool 410 respectively.

The extents 312, 322, 332 and 342 are used for storing data D00, D01, D02 and D03 respectively, and the extent 352 is used for storing parity P0. According to one implementation of the present disclosure, it can be learned by determining an access level of each extent in the stripe 220 that the access level of the extent 352 is much higher than those of other extents because the extent 352 is used for storing parity P0. Further, the usage state of the storage device 350 where the extent 352 resides may be determined. If it is found the storage device 350 is worn to a great degree, when the extent 352 is faced with many access operations, the storage device 350 where the extent 352 resides is confronted with a huge risk. Once the storage device 350 breaks down, the reliability of the storage system will be reduced.

At this point, how to handle a mapping relationship between a target extent and a target storage device may be determined on the basis of the access level and usage state of the extent 352. Since the extent 352 has a higher access level and the storage system 350 is worn to a great degree, a further extent may be selected from other storage device (e.g., the storage device 360) in the storage device pool 410 to replace the extent 352.

Figure 5:
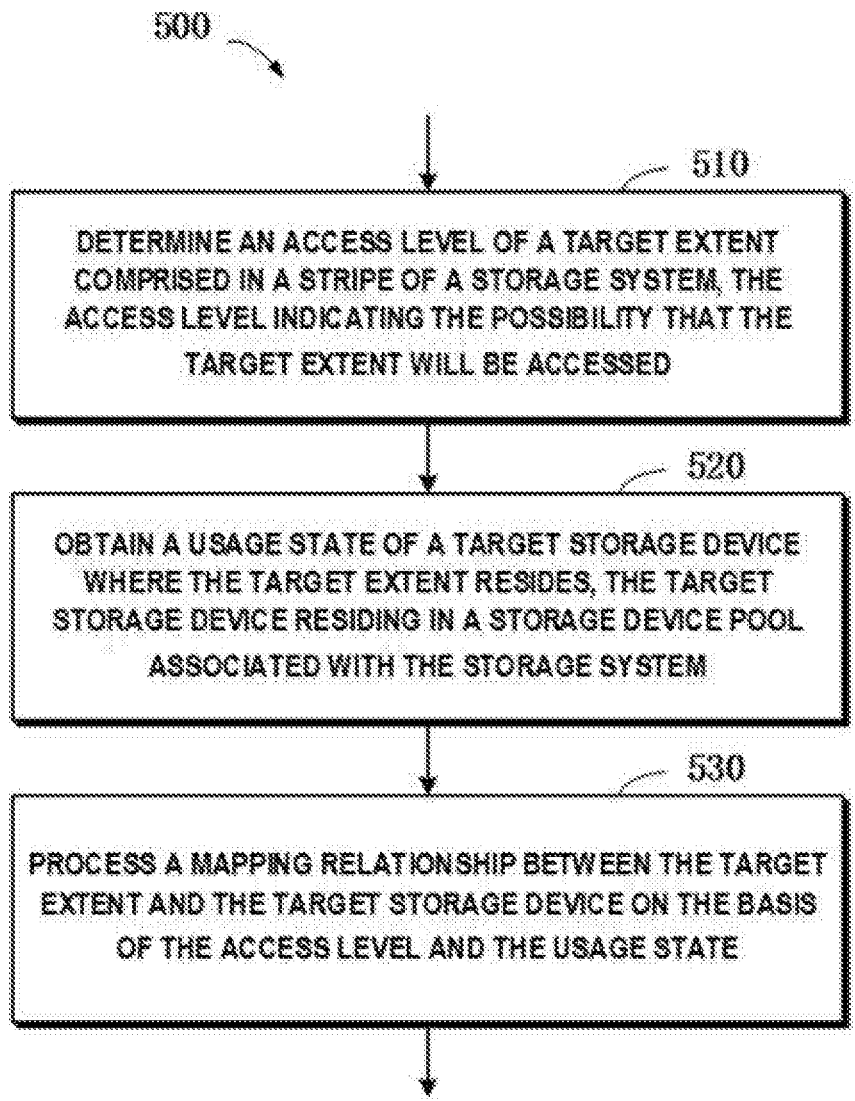
FIG. 5 schematically illustrates a flowchart of a method for managing a storage system according to one implementation of the present disclosure.

With reference to FIG. 5, a detailed description is presented below to concrete steps of a method according to one implementation of the present disclosure. FIG. 5 schematically shows a flowchart of a method 500 for managing a storage system according to one implementation of the present disclosure. As depicted, in block 510, an access level of a target extent comprised in a stripe of the storage system is determined, here the access level indicates the possibility that the target extent will be accessed. It will be appreciated that the access level is an indicator indicative of access frequency, and it is not limited in which way the access level is represented. Through the context of the present disclosure, the access level may be represented with different units. For example, the access level may be represented by an access count per second or may be represented in the form of a relative value. Continuing the example of the 4D+1P storage system shown in FIG. 4, suppose the access level of a data extent is represented by a unit of 1, since every time a write is performed to any of the 4 data extents, data is written to the parity extent, the access level of the parity extent may be presented by 4. In other words, the parity extent has an access level 4 times as large as the data extent.

In block 520, usage state of a target storage device where the target extent resides is obtained, the target storage device residing in a storage device pool associated with the storage system. Here the usage state may represent a wear level of a target storage device where the target extent resides. For example, regarding an SSD storage device, the wear level may be directly read from the SSD storage device. Continuing the example shown in FIG. 4, the usage state associated with the extent 352 is the wear level of the storage device 350, and the usage state associated with the extent 312 is the wear level of the storage device 310.

In block 530, a mapping relationship between the target extent and the target storage device is handled on the basis of the access level and the usage state. At this point, the mapping relationship may be handled according to the access level and the usage state. If the access level is higher and the usage state indicates the wear level of the storage device is high too, then the mapping relationship may be modified (e.g. an extent in other storage device having a lower wear level may be selected to replace the target extent so as to update the mapped storage system). If the access level is lower and the usage state indicates the wear level of the storage device is low too, then the existing mapping relationship may be maintained.

Figure 6:
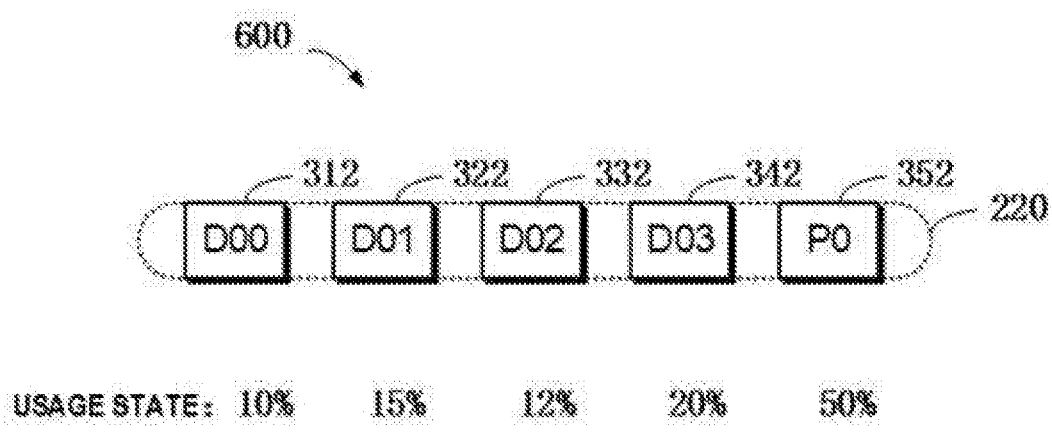
FIG. 6 schematically illustrates a block diagram for processing a mapping relationship between a target extent and a target storage device according to one implementation of the present disclosure.

FIG. 6 schematically shows a block diagram 600 for handling a mapping relationship between a target extent and a target storage device according to one implementation of the present disclosure. As depicted, a stripe 220 comprises multiple extents, among which extents 312, 322, 332 and 342 are used for storing data blocks D00, D01, D02 and D03 respectively and an extent 352 is used for storing parity P0. The usage state of a storage device where each extent resides is shown at the bottom of FIG. 6. When represented as the wear level, the usage state may be denoted by a percentage or other value (e.g. time, access count, etc.).

Specifically, the wear level of a storage device where the extent 312 resides is 10%, which means the wear of the current storage device amounts to 10%. Suppose access operations to the storage device are substantially uniform, when the wear is measured by time, if the storage device has been used for 1 month, then 10% may represent the storage device has a life of 10 months and may be used for 9 more months in future. As depicted, usage states of storage devices where the extents 312, 322, 332, 342 and 352 reside are 10%, 15%, 12%, 20% and 50% respectively.

According to one implementation of the present disclosure, the stripe comprises a set of extents having a first type (e.g. data) or a second type (e.g. parity) extents (the extents 312, 322, 332, 342 and 352). The access level of the target extent may be determined on the basis of the type of the target extent. Continuing the example in FIG. 6, where the extents 312, 322, 332 and 342 are used for storing data and the extent 352 is used for storing parity, since the access frequency of parity is much higher than that of data, it may be determined that the extent 352 is a parity type extent and further has a higher access level.

In the example of FIG. 6, it is determined that the extent 352 is a parity type extent and the wear level of a storage device where the extent resides is 50%. Since 50% denotes a high wear level, at this point it may be determined that the extent 352 is faced with a potential risk and may be replaced by an extent in other storage device having a lower wear level (e.g. 50% below).

According to one implementation of the present disclosure, the stripe comprises multiple sub-stripes, a sub-stripe among the multiple sub-stripes comprising a set of sub-extents consisting of respective sub-extents in extents of the set of extents, a sub-extent in the set of sub-extents having a first type or a second type. In the mapped storage system, an extent from one storage device may be a large extent, and one stripe may further comprise multiple sub-stripes. At this point, the sub-stripe may be construed as a stripe having smaller granularity.

Figure 7:
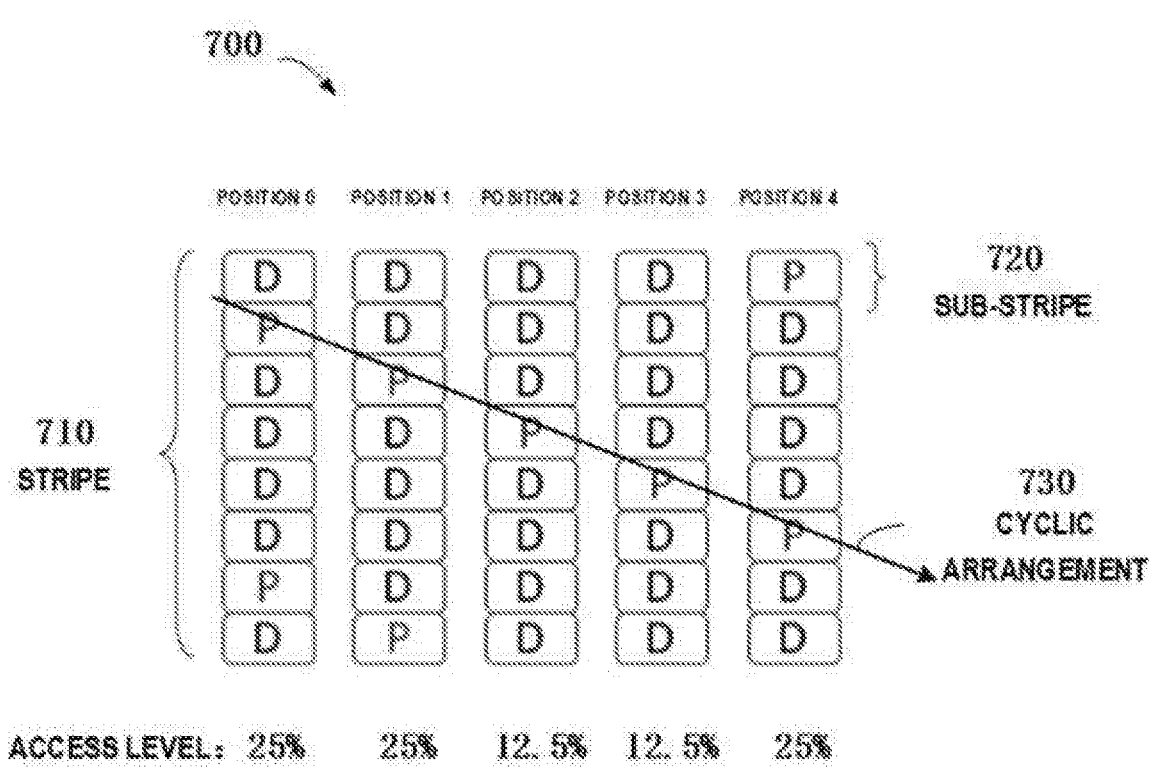
FIG. 7 schematically illustrates a block diagram of cyclically arranged sub-extents for storing data and parity according to one implementation of the present disclosure.

FIG. 7 schematically shows a block diagram 700 of cyclically arranged sub-extents for storing parity according to one implementation of the present disclosure. As depicted, a stripe 710 comprises 8 sub-stripes across multiple extents. The first row of extents in the stripe 710 represents a sub-stripe 720 (4 data extents and 1 parity extent), and each row of extents under the stripe 720 represents one sub-stripe.

It will be appreciated that the arrangement mode of extents in each sub-stripe may be arbitrary. For example, in each sub-stripe data may be stored at positions 0 to 3, and parity may be stored at position 4. Alternatively or additionally, different types of information may be stored at different positions. For example, with reference to the second sub-stripe in the stripe 710, parity is stored at position 0, and data is stored at following positions 1 to 4. Further, in stripes subsequent to the stripe 720, different types of extents may be cyclically arranged in a direction as shown by arrow 730. For example, parity may be stored at position 0 in the second sub-stripe, at position 1 in the third sub-stripe, at position 2 in the fourth sub-stripe, . . . , at position 0 in the seventh sub-stripe, at position 1 at the eighth sub-stripe, and so on and so forth.

Where one stripe comprises multiple sub-stripes, the access level may be determined on the basis of the type of one of more sub-stripes comprised in the target extent. Specifically, in the example shown in FIG. 7, respective sub-extents at position 0 reside in the same storage device, at which point the access level of an extent at position 0 may be determined on the basis of the type of each sub-extent at position 0.

According to one implementation of the present disclosure, a proportion of sub-extents having second type in the target extent may be determined; subsequently, the access level may be determined on the basis of the proportion. Take an extent at position 0 in FIG. 7 as an example. This extent comprises 8 sub-extents, among which 6 sub-extents are used for storing data and 2 sub-extents are used for storing parity. At this point, a proportion of the sub-extents for storing parity to all the sub-extents in the extent is 2/8=25%. Therefore, the access level may be indicated by the determined proportion.

Likewise, the access level of an extent at other position may be determined. For example, an extent at position 1 comprises 2 sub-extents for storing parity, so its access level is 2/8=25%. An extent at position 2 comprises 1 sub-extent for storing parity, so its access level is 1/8=12.5%. An extent at position 3 comprises 1 sub-extent for storing parity, so its access level is 1/8=12.5%. An extent at position 4 comprises 2 sub-extents for storing parity, so its access level is 2/8=25%. According to one implementation of the present disclosure, in response to the access level being higher than an access level of a further extent other than the target extent in the stripe, the target extent is mapped to a further storage device in the storage device pool other than a storage device where the stripe resides. The higher the access level, the more frequently the stripe will be accessed, and the more likely the stripe will be damaged. Therefore, preferentially an extent having a higher access level may be remapped to other more reliable device in the storage device pool 410.

An extent having a higher access level (e.g. extents at positions 0, 1 and 4 in FIG. 7) may be selected from extents, and then the selected extent may be judged whether the wear degree of a storage device where the extent resides puts the extent at potential risk. Take an extent at position 4 as an example, whose access level is relatively high (25%). Suppose the wear level of a storage device where the extent resides is already as high as 50%, then it may be considered that more access to the extent will cause more wear to the storage device, so remapping may be performed.

Note since the remapped storage system is required to keep properties of mapped RAID, it should be ensured that the remapped extent is from a storage device other than storage devices where the extents associated with the current stripe reside. Suppose extents at positions 0 to 3 come from storage devices 0 to 3 respectively, and an extent at position 4 comes from storage device 4. During remapping, the extent at position 4 may be replaced by an extent in a further storage device other than storage devices 0 to 4 in the storage device pool.

According to one implementation of the present disclosure, when sub-extents in the stripe are cyclically arranged in order of the first type and the second type, sub-extents having the second type are regularly arranged (for example, a position of a parity sub-extent in the previous sub-stripe is moved backward by one position). At this point, the access level may be determined on the basis of the number of the set of sub-stripes, the number of the sub-extents having the first type, the number of the sub-extents having the second type as well as a start position of the sub-extents having the second type.

Note while the situation where one stripe comprises 8 sub-stripes has been shown in the context of a 4D+1P storage system, according to one implementation of the present disclosure, the storage system may further be of other type, e.g. a 3D+1P, 4D+1P+1Q or 4D+1P+1Q+1R storage system. To generally represent the respective numbers of data extents and parity extents in one stripe, the number of data extents may be denoted by W, the number of parity extents may be denoted by M, and the width of an entire stripe may be denoted by width.

Let i (i is an integer between 0 and width−1) denote the ith position in a stripe, and let n denote the nth stripe in the storage system. At this point, the access level ParityPercentage(n, i) of an extent at the ith position in the nth stripe in the storage system may be determined from formula group 1.

$ParityPercentage(n, i) =$ \hfill formula group 1

$$\text{floor}\left(\frac{\frac{DE}{P} - p0index(n, i) + (\text{width}-1)}{\text{width}}\right) \bigg/ \left(\frac{DE}{P}\right)$$

$p0index(n, i) =$ $$\left(\text{width} - \left(n * \frac{DE}{P} - (i+1)\right)\% \text{ width}\right)\% \text{ width}$$

$$\text{width} = (W + M)$$

In formula group 1, floor denotes a round down operation, DE denotes the size of an extent, P denotes the size of a sub-extent, p0index(n,i) denotes the start position of a parity sub-extent in the nth sub-stripe, width denotes the width of the stripe, W denotes the number of data extents, and M denotes the number of parity extents.

Note in formula group 1, how to determine the access level has been described by taking an example where the parity sub-extents start from the last position among multiple positions. According to one implementation of the present disclosure, when the parity sub-extents start from other position, the access level may be determined from other formula. According to one implementation of the present disclosure, the parity may loop using different step sizes. At this point, those skilled in the art may calculate an offset value of each parity sub-extent at a position on the basis of a concrete step size and further determine a corresponding access level on the basis of the offset value.

Figure 8:
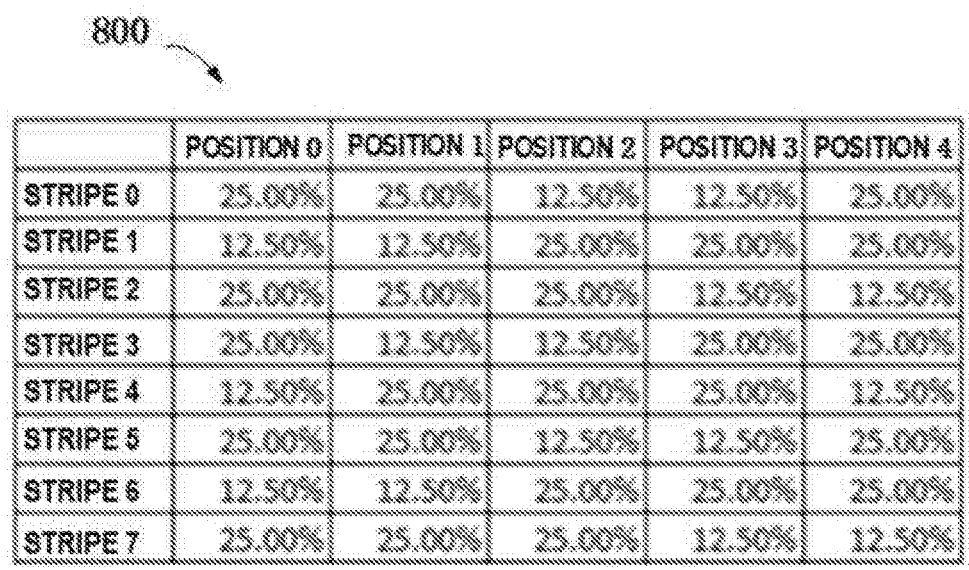
FIG. 8 schematically illustrates a schematic view of access levels of extents in respective stripes in a storage system according to one implementation of the present disclosure.

Using the formulas as shown above, in the 4D+1P storage system, when parity sub-extents in the first sub-stripe start from the last position, the determined percentage of each extent in the storage system is as shown in FIG. 8, which illustrates a schematic view 800 of access levels of extents in each stripe in a storage system according to one implementation of the present disclosure.

In the storage system shown in FIG. 8, comprised are 8 stripes (stripe 0 to stripe 7). As depicted, the value at an intersection of stripe and position denotes the percentage of parity sub-extents in a corresponding extent. Specifically, stripe 0 corresponds to the stripe 710 in FIG. 7, and parity sub-extents in the extent at position 0 take a percentage of 25% and parity sub-extents in the extent at position 1 take a percentage of 25%. For another example, regarding stripe 2, parity sub-extents in the extent at position 3 take a percentage of 12.50%. Based on the percentages in FIG. 8, extents with an access level of 25% may be processed first, and then extents with an access level of 12.50% may be processed later. According to one implementation of the present disclosure, extents may be ranked in decreasing order by percentage, and those with a higher percentage may be processed first.

According to one implementation of the present disclosure, in response to the usage state satisfying a first predefined condition, the target extent is mapped to the further storage device. In other words, whether to perform a remapping operation may be determined on the basis whether the usage state satisfies a predefined condition or not. For example, if the access level indicates the target extent has a high access frequency, whereas the usage state of a storage device where the target extent resides shows the storage device is almost new, then at this point there is no need to perform a remapping operation immediately. For another example, if the access level indicates the target extent has a high access frequency, and the usage state of a storage device where the target extent resides shows the storage device has a high wear level, then remapping may be performed.

According to one implementation of the present disclosure, a free extent may be replaced with a further extent in a storage device with a usage state better than that of the target device in the storage device pool 410. In other words, the usage state of the replacing extent is better than that of the target device. In this way, since the storage system is built using extents in a storage device with a better and more reliably usage state, it may be guaranteed the storage system has a higher reliability.

Concrete details of handling the mapping relationship on the basis of an access level in the storage system have been described above. It will be appreciated the current access level is a "static" access level that is determined on the basis of the type of each extent in a stripe in the storage system. According to one implementation of the present disclosure, the future possibility of each extent in the stripe may further be predicted from historical access frequency of each stripe in the storage system.

According to one implementation of the present disclosure, first an access history of the stripe may be determined, and when the history satisfies a second predefined condition, the mapping relationship between the target extent and the target storage device is processed on the basis of the access level and the usage state. In this way, the possibility that a stripe will be accessed in future may be estimated on the basis of the access history of the stripe.

According to one implementation of the present disclosure, the history may be described in various manners. For example, the history may be described as the count that the stripe has been accessed in a previous predefined period of time. Alternatively or additionally, the history may be described as the amount of accessed data or using other method. If the history indicates a stripe (or the target extent itself) where the target extent resides has been accessed frequently (e.g. access frequency is higher than a predefined value), then the target extent will be processed first. For another example, if the history indicates a stripe (or the target extent itself) where the target extent resides has not been accessed for a long time, then the target extent may be processed later.

According to one implementation of the present disclosure, the access level may be determined on the basis of both the percentage and the historical frequency. For example, the access level may be determined on the basis of a product or weighted sum of both the percentage and the historical frequency. Suppose the first target extent has a percentage of 12.5% and a historical frequency of 10 times/second, and the second target extent has a percentage of 25% and a historical frequency of 1 time/second. At this point, the access level for the first target extent may be denoted as 12.5×10=1.25, and the access level for the second target extent may be denoted as 25%×1=0.25. Since 1.25>0.25, the first target extent may be processed preferentially.

According to one implementation of the present disclosure, where the respective extents have similar or identical access levels, an extent in a storage device with a worse usage state may be processed preferentially. For example, usage states of storage devices where multiple extents in stripes in the storage system reside may further be ranked. With reference to concrete values of the access levels shown in FIG. 8, extents with an access level of 25% may be processed preferentially in a bad-to-good order of usage state.

According to one implementation of the present disclosure, the target storage device is a solid-state storage device, and the obtaining a usage state of the target storage device comprises: reading a wear level of the solid-state storage device as the usage state. It will be appreciated the wear level is an effective index describing the life of the solid-state storage device. Where the storage device pool is constructed on the basis of solid-state storage devices, the wear level may be directly read from the solid-state storage device as the usage state.

Various implementations implementing the method of the present invention have been described above with reference to the accompanying drawings. Those skilled in the art may understand the method may be implemented in software, hardware or a combination of software and hardware. Moreover, those skilled in the art may understand by implementing various steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various implementations of the present invention. The apparatus described in the present invention comprises several means or modules, which are configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As a detailed and complete description has been presented above, it might be ignored below.

Figure 9:
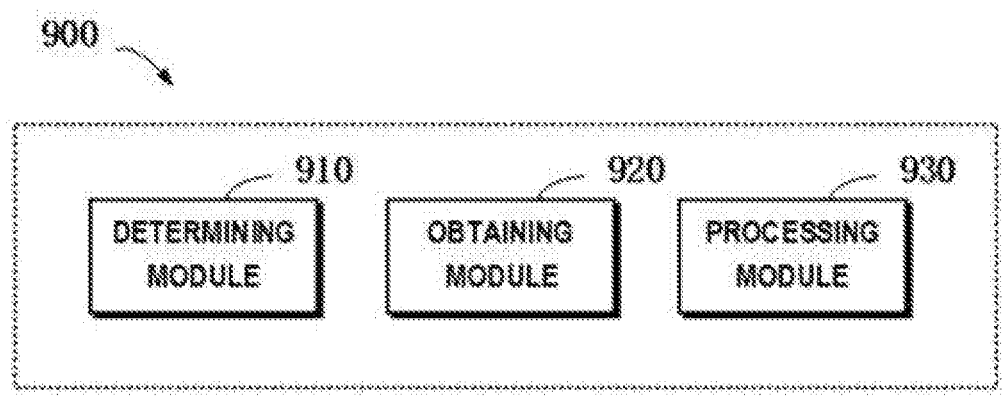
FIG. 9 schematically illustrates a block diagram of an apparatus for managing a storage system according to one implementation of the present disclosure.

FIG. 9 schematically shows a block diagram of an apparatus 900 for managing storage according to one implementation of the present disclosure. The apparatus 900 comprises: a determining module 910 configured to determine an access level of a target extent comprised in a stripe of a storage system, the access level indicating the possibility that the target extent will be accessed; an obtaining module 920 configured to obtain a usage state of a target storage device where the target extent resides, the target storage device residing in a storage device pool associated with the storage system; and a processing module 930 configured to process a mapping relationship between the target extent and the target storage device on the basis of the access level and the usage state.

According to one implementation of the present disclosure, the stripe comprises a set of extents having a first type or a second type, and the determining module 910 is further configured to determine the access level of the target extent on the basis of the type of the target extent.

According to one implementation of the present disclosure, the stripe comprises multiple sub-stripes, a sub-stripe among the multiple sub-stripes comprising a set of sub-extents comprising respective sub-extents in respective extents in the set of extents, a sub-extent in the set of sub-extents having a first type or a second type. The determining module 910 is further configured to determine the access level on the basis of the type of one or more sub-extents comprised in the target extent.

According to one implementation of the present disclosure, the determining module 910 is further configured to: determine a proportion of sub-extents having the second type in the target extent to the target extent; and determine the access level on the basis of the proportion.

According to one implementation of the present disclosure, sub-extents in the stripe are cyclically arranged in order of the first type and the second type. The determining module 910 is further configured to: determine the access level on the basis of the number of the set of sub-stripes, the number of the sub-extents having the first type, the number of the sub-extents having the second type as well as a start position of the sub-extents having the second type.

According to one implementation of the present disclosure, the processing module 930 is further configured to: in response to the access level being higher than an access level of a further extent other than the target extent in the stripe, map the target extent to a further storage device in the storage device pool other than a storage device where an extent in the stripe resides.

According to one implementation of the present disclosure, the processing module 930 is further configured to: in response to the usage state satisfying a first predefined condition, map the target extent to the further storage device.

According to one implementation of the present disclosure, a usage state of the further storage device is better than the usage state of the target device.

According to one implementation of the present disclosure, the determining module 910 is further configured to determine an access history of the stripe; and the processing module 930 is further configured to: in response to the history satisfying a second predefined condition, process a mapping relationship between the target extent and the target storage device on the basis of the access level and the usage state.

According to one implementation of the present disclosure, the target storage device is a solid-state storage device. The obtaining module 920 is further configured to read a wear level of the solid-state storage device as the usage state.

According to one implementation of the present disclosure, there is provided a system for managing a storage system, comprising: one or more processors; a memory coupled to at least one processor of the one or more processors; computer program instructions stored in the memory which, when executed by the at least one processor, cause the system to execute a method for managing a storage system. The method comprises: determining an access level of a target extent comprised in a stripe of a storage system, the access level indicating the possibility that the target extent will be accessed; obtaining a usage state of a target storage device where the target extent resides, the target storage device residing in a storage device pool associated with the storage system; and processing a mapping relationship between the target extent and the target storage device on the basis of the access level and the usage state.

According to one implementation of the present disclosure, the stripe comprises a set of extents having a first type or a second type, and the determining an access level comprises: determining the access level of the target extent on the basis of a type of the target extent.

According to one implementation of the present disclosure, the stripe comprises multiple sub-stripes, a sub-stripe among the multiple sub-stripes comprising a set of sub-extents comprising a sub-extent in each extent in the set of extents, a sub-extent in the set of sub-extents having a first type or a second type.

According to one implementation of the present disclosure, the determining an access level of a target extent comprises: determining the access level on the basis of the type of one or more sub-extents comprised in the target extent.

According to one implementation of the present disclosure, the determining an access level comprises: determining a proportion of sub-extents having the second type in the target extent to the target extent; and determining the access level on the basis of the proportion.

According to one implementation of the present disclosure, sub-extents in the stripe are cyclically arranged in order of the first type and the second type.

According to one implementation of the present disclosure, the determining a proportion comprises: determining the access level on the basis of the number of the set of sub-stripes, the number of the sub-extents having the first type, the number of the sub-extents having the second type as well as a start position of the sub-extents having the second type.

According to one implementation of the present disclosure, the processing a mapping relationship between the target extent and the target storage device comprises: in response to the access level being higher than an access level of a further extent other than the target extent in the stripe, mapping the target extent to a further storage device in the storage device pool other than a storage device where an extent in the stripe resides.

According to one implementation of the present disclosure, in response to the usage state satisfying a first predefined condition, the target extent is mapped to the further storage device.

According to one implementation of the present disclosure, a usage state of the further storage device is better than the usage state of the target device.

According to one implementation of the present disclosure, an access history of the stripe is determined.

According to one implementation of the present disclosure, the processing a mapping relationship between the target extent and the target storage device further comprises: in response to the history satisfying a second predefined condition, processing a mapping relationship between the target extent and the target storage device on the basis of the access level and the usage state.

According to one implementation of the present disclosure, the target storage device is a solid-state storage device.

According to one implementation of the present disclosure, the obtaining a usage state of the target storage device comprises: reading a wear level of the solid-state storage device as the usage state.

In one implementation of the present disclosure, there is provided a computer program product tangibly stored on a non-transient computer readable medium and comprising machine executable instructions which, when executed, cause the machine to execute a method for managing a storage system. The method comprises: determining an access level of a target extent comprised in a stripe of a storage system, the access level indicating the possibility that the target extent will be accessed; obtaining a usage state of a target storage device where the target extent resides, the target storage device residing in a storage device pool associated with the storage system; and processing a mapping relationship between the target extent and the target storage device on the basis of the access level and the usage state.

According to one implementation of the present disclosure, the stripe comprises a set of extents having a first type or a second type, and the determining an access level comprises: determining the access level of the target extent on the basis of the type of the target extent.

According to one implementation of the present disclosure, the stripe comprises multiple sub-stripes, a sub-stripe among the multiple sub-stripes comprising a set of sub-extents comprising respective sub-extents in respective extents in the set of extents, a sub-extent in the set of sub-extents having a first type or a second type, wherein the determining the access level of the target extent on the basis of the type of the target extent comprises: determining the access level on the basis of the type of one or more sub-extents comprised in the target extent.

According to one implementation of the present disclosure, the determining the access level on the basis of the type of one or more sub-extents comprised in the target extent comprises: determining a proportion of sub-extents having the second type in the target extent to the target extent; and determining the access level on the basis of the proportion.

According to one implementation of the present disclosure, sub-extents in the stripe are cyclically arranged in order of the first type and the second type, and the determining a proportion comprises: determining the access level on the basis of the number of the set of sub-stripes, the number of the sub-extents having the first type, the number of the sub-extents having the second type as well as a start position of the sub-extents having the second type.

According to one implementation of the present disclosure, the processing a mapping relationship between the target extent and the target storage device comprises: in response to the access level being higher than an access level of a further extent other than the target extent in the stripe, mapping the target extent to a further storage device in the storage device pool other than a storage device where an extent in the stripe resides.

According to one implementation of the present disclosure, in response to the usage state satisfying a first predefined condition, the target extent is mapped to the further storage device.

According to one implementation of the present disclosure, a usage state of the further storage device is better than the usage state of the target device.

According to one implementation of the present disclosure, an access history of the stripe is determined; and the processing a mapping relationship between the target extent and the target storage device further comprises: in response to the history satisfying a second predefined condition, processing a mapping relationship between the target extent and the target storage device on the basis of the access level and the usage state.

According to one implementation of the present disclosure, the target storage device is a solid-state storage device, and the obtaining a usage state of the target storage device comprises: reading a wear level of the solid-state storage device as the usage state.

The flowchart and block diagrams in the Figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

The invention claimed is:

1. A method for managing a storage system, comprising:
   determining an access level of a target extent comprised in a stripe of a storage system, the access level indicating the possibility that the target extent will be accessed;
   obtaining a usage state of a target storage device where the target extent resides, the target storage device residing in a storage device pool associated with the storage system; and
   processing a mapping relationship between the target extent and the target storage device on the basis of the access level and the usage state;
   wherein the stripe comprises a set of extents having a first type or a second type, and wherein the determining an access level comprises:
      determining the access level of the target extent on the basis of a type of the target extent.

2. The method according to claim 1, wherein the stripe comprises multiple sub-stripes, a sub-stripe among the multiple sub-stripes comprising a set of sub-extents comprising respective sub-extents in respective extents in a set of extents, a sub-extent in the set of sub-extents having the first type or the second type, wherein the determining the access level of the target extent on the basis of the type of the target extent comprises:
  determining the access level on the basis of the type of one or more sub-extents comprised in the target extent.

3. The method according to claim 2, wherein the determining the access level on the basis of the type of one or more sub-extents comprised in the target extent comprises:
  determining a proportion of sub-extents having the second type in the target extent to the target extent; and
  determining the access level on the basis of the proportion.

4. The method according to claim 3, wherein sub-extents in the stripe are cyclically arranged in order of the first type and the second type, and the determining a proportion comprises:
  determining the access level on the basis of the number of the set of sub-stripes, the number of sub-extents having the first type, the number of the sub-extents having the second type as well as a start position of the sub-extents having the second type.

5. The method according to claim 1, wherein the processing a mapping relationship between the target extent and the target storage device comprises:
  in response to the access level being higher than an access level of a further extent other than the target extent in the stripe, mapping the target extent to a further storage device in the storage device pool other than a storage device where an extent in the stripe resides.

6. The method according to claim 5, further comprising:
  in response to the usage state satisfying a first predefined condition, mapping the target extent to the further storage device.

7. The method according to claim 6, wherein a usage state of the further storage device is better than the usage state of the target device.

8. The method according to claim 1, further comprising: determining an access history of the stripe; and
  wherein the processing a mapping relationship between the target extent and the target storage device further comprises: in response to the history satisfying a second predefined condition, processing a mapping relationship between the target extent and the target storage device on the basis of the access level and the usage state.

9. The method according to claim 1, wherein the target storage device is a solid-state storage device, and the obtaining a usage state of the target storage device comprises: reading a wear level of the solid-state storage device as the usage state.

10. A system for managing a storage system, comprising:
  one or more processors;
  a memory coupled to at least one processor of the one or more processors;
  computer program instructions stored in the memory which, when executed by the at least one processor, cause the system to execute a method for managing a storage system, the method comprising:
    determining an access level of a target extent comprised in a stripe of a storage system, the access level indicating the possibility that the target extent will be accessed;
    obtaining a usage state of a target storage device where the target extent resides, the target storage device residing in a storage device pool associated with the storage system; and
    processing a mapping relationship between the target extent and the target storage device on the basis of the access level and the usage state;
  wherein the stripe comprises a set of extents having a first type or a second type, and wherein the determining an access level comprises:
    determining the access level of the target extent on the basis of a type of the target extent.

11. The system according to claim 10, wherein the stripe comprises multiple sub-stripes, a sub-stripe among the multiple sub-stripes comprising a set of sub-extents comprising respective sub-extents in respective extents in a set of extents, a sub-extent in the set of sub-extents having the first type or the second type, wherein the determining the access level of the target extent on the basis of the type of the target extent comprises:
  determining the access level on the basis of the type of one or more sub-extents comprised in the target extent.

12. The system according to claim 11, wherein the determining the access level on the basis of the type of one or more sub-extents comprised in the target extent comprises:
  determining a proportion of sub-extents having the second type in the target extent to the target extent; and
  determining the access level on the basis of the proportion.

13. The system according to claim 12, wherein sub-extents in the stripe are cyclically arranged in order of the first type and the second type, and the determining a proportion comprises:
  determining the access level on the basis of the number of the set of sub-stripes, the number of the sub-extents having the first type, the number of the sub-extents having the second type as well as a start position of the sub-extents having the second type.

14. The system according to claim 10, wherein the processing a mapping relationship between the target extent and the target storage device comprises:
  in response to the access level being higher than an access level of a further extent other than the target extent in the stripe, mapping the target extent to a further storage device in the storage device pool other than a storage device where an extent in the stripe resides.

15. The system according to claim 14, the method further comprising:
  in response to the usage state satisfying a first predefined condition, mapping the target extent to the further storage device.

16. The system according to claim 15, wherein a usage state of the further storage device is better than the usage state of the target device.

17. The system according to claim 10, the method further comprising: determining an access history of the stripe; and
  wherein the processing a mapping relationship between the target extent and the target storage device further comprises: in response to the history satisfying a second predefined condition, processing a mapping relationship between the target extent and the target storage device on the basis of the access level and the usage state.

18. The system according to claim 10, wherein the target storage device is a solid-state storage device, and the obtaining a usage state of the target storage device comprises: reading a wear level of the solid-state storage device as the usage state.

19. A computer program product having a non-transitory computer readable medium which stores a set of instructions to manage a storage system; the set of instructions, when carried out by computerized circuitry, causing the computerized circuitry to perform a method of:

determining an access level of a target extent comprised in a stripe of the storage system, the access level indicating the possibility that the target extent will be accessed;

obtaining a usage state of a target storage device where the target extent resides, the target storage device residing in a storage device pool associated with the storage system; and processing a mapping relationship between the target extent and the target storage device on the basis of the access level and the usage state;

wherein the stripe comprises a set of extents having a first type or a second type, and wherein the determining an access level comprises:

determining the access level of the target extent on the basis of a type of the target extent.

20. The computer program product according to claim 19, wherein the stripe comprises multiple sub-stripes, a sub-stripe among the multiple sub-stripes comprising a set of sub-extents comprising respective sub-extents in respective extents in a set of extents, a sub-extent in the set of sub-extents having the first type or the second type, wherein the determining the access level of the target extent on the basis of the type of the target extent comprises:

determining the access level on the basis of the type of one or more sub-extents comprised in the target extent.

\* \* \* \* \*